US005584555A

United States Patent [19]

Larsson

[11] Patent Number: 5,584,555

[45] Date of Patent: Dec. 17, 1996

[54] LIGHT EMITTING PUSH BUTTON

[75] Inventor: Stig T. Larsson, Bandhagen, Sweden

[73] Assignee: Telefonaktiebolaget LM Ericsson, Stockholm, Sweden

[21] Appl. No.: 343,903

[22] Filed: Nov. 17, 1994

[30] Foreign Application Priority Data

Nov. 29, 1993 [SE] Sweden .................................. 9303959

[51] Int. Cl.[6] .................................................... G01D 11/28

[52] U.S. Cl. ................................ 362/23; 362/24; 362/29; 362/311; 362/360; 200/314; 428/46

[58] Field of Search .................................... 200/310, 313, 200/314; 362/23, 24, 28, 29, 311, 351, 360; 428/13, 46, 67

[56] References Cited

U.S. PATENT DOCUMENTS

| | | | |
|---|---|---|---|
| 2,953,668 | 9/1960 | Bassett, Jr. | 200/313 |
| 3,163,739 | 12/1964 | Hutt | 200/314 |
| 4,563,550 | 1/1986 | Bertina | 200/314 |
| 4,924,044 | 5/1990 | Takahashi et al. | 200/314 |
| 5,081,329 | 1/1992 | Mitusinski et al. | 200/314 |
| 5,120,920 | 6/1992 | Moriike | 200/310 |
| 5,510,782 | 4/1996 | Norris et al. | 200/314 |

FOREIGN PATENT DOCUMENTS

| | | | |
|---|---|---|---|
| 310889A2 | 4/1989 | European Pat. Off. . | |
| 1166409 | 10/1969 | United Kingdom | 200/314 |

*Primary Examiner*—Ira S. Lazarus
*Assistant Examiner*—Alan B. Cariaso
*Attorney, Agent, or Firm*—Burns, Doane, Swecker & Mathis, L.L.P.

[57] ABSTRACT

A light emitting push button for operating purposes, for instance a number button on a telephone apparatus, includes a body which is double-molded from two different plastic materials, of which one material is light conductive and the other is opaque. Light from a light emitting device, such as a light emitting diode, striking the underside of the push button is conducted through the light conductive material and is emitted on the upper side of the button. A slot is formed between the light conductive material and the opaque material on the upper side of the button, such that light conducted through the light conductive material will be scattered uniformly and be visible from all directions.

6 Claims, 1 Drawing Sheet

LIGHT EMITTING PUSH BUTTON

BACKGROUND

The present invention relates to a light-emitting push button for operating purposes, for instance a number button on a telephone apparatus, wherein the push button includes a body which has been double-molded in two different plastic materials, of which one material is light conductive and the other is opaque. A light emitting device, such as a light emitting diode, is arranged to emit light on the underside of the press button, so that light will be conducted through the light conductive material and be emitted on the upper side of the button.

Light-emitting push buttons of the aforedescribed kind are known to the art. Although the majority of existing buttons provided with light conductors light up well, there is often an angle or angles of incidence at which the light almost disappears, depending on the line of sight. The lens requires free surfaces around the lens, in order for the light to be reflected from the sides and so as to obtain the best possible light yield at the top of the button. A light conductor integrated in such a double-molded button, for instance in telephone apparatus, makes it difficult to discern whether the button is lit or not when viewed in a direction towards the button, because the light is not scattered uniformly at the upper surface of the button.

This is because the material in the button and the lens is fused or migrated together by heat in the molding process, and the light reflections in this part is "extinguished" or dampened out. A light conductor which is completely molded in would dampen the reflection of light excessively.

SUMMARY

An object of the present invention is to avoid the drawback of not being able to see the light from all directions, and to provide a press button in which light is scattered uniformly at the top of the button, such that the light yield at the button top will be the best possible for all angles of incidence. This object is achieved by forming an air gap or slot which extends to slightly below the top of the lens, between button and lens, so that light will be reflected against the lens surface thus exposed.

An inventive push button affords the advantage that the light yield will be practically uniform in all directions, or in other words there are found no angles of incidence at which the light will disappear irrespective of the line of sight, but that the button will be clearly visible from all directions.

The invention will now be described in more detail with reference to an exemplifying embodiment thereof and also with reference to the accompanying drawing.

DETAILED DESCRIPTION

Figure 1:
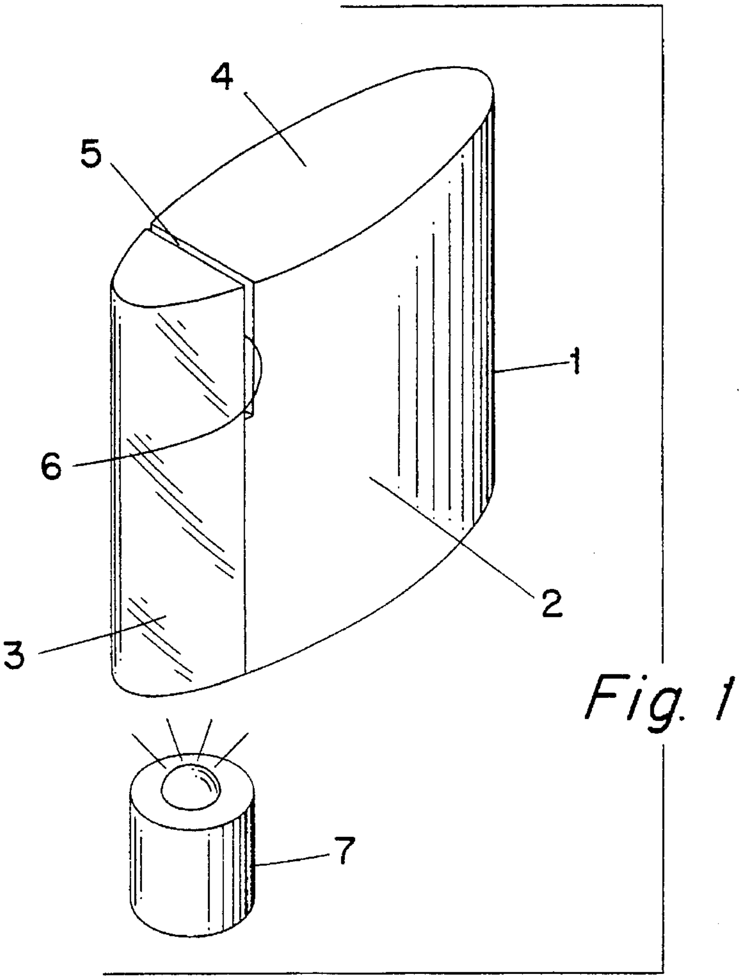
FIG. 1 is a perspective view of an inventive light emitting push button.

FIG. 1 illustrates in perspective a preferred embodiment of a light-emitting push button 1. The push button 1 is ellipsoidal in shape and includes a double-molded body of opaque material 2 and a light conductive material 3 respectively. The light conductive material 3 can be considered to form a lens through which light can be conducted from the underside of the button, for instance from a light emitting diode or like device 7, up through the lens and radiate from the upper side 4 of the button.

By providing an air slot 5 between the opaque material 2 and the lens 3 down to a distance of about 4 mm from the lens top, light is able to reflect against the thus exposed surface 6 of the lens. The slot 5 located between the aforesaid different materials need only have a width of some tenths of a millimeter in order for the desired reflection to be achieved, although from a tool/technical aspect the slot will have a width of about 0.5 mm in practice.

Some of the details concerning the design of the press button with regard to its attachment to the equipment to which it belongs, or other elements that are dependent on the function of the push button have not been shown in the drawing. The design of these details and elements will be obvious to one of normal skill in this art and form no part of the present invention.

Figure 2:
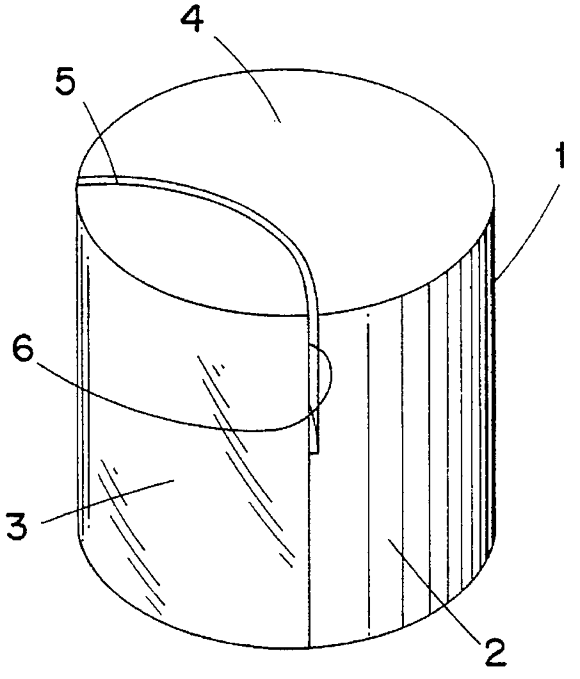
FIG. 2 and FIG. 3 are perspective views of alternative embodiments of an inventive light-emitting push button.
Figure 3:
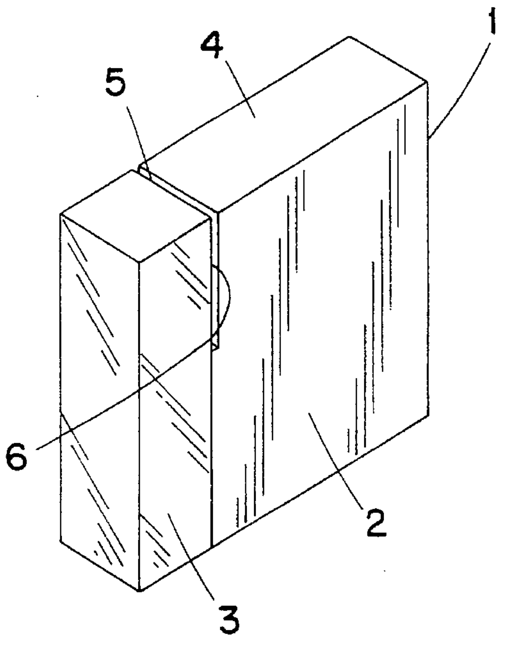

The push button 1 need not, of course, have the ellipsoidal shape shown in FIG. 1. Other designs may incorporate the same technical solution, for instance the round press button shown in FIG. 2 and the rectangular press button shown in FIG. 3. The same reference numerals have been used in these latter figures as those used in FIG. 1. Press buttons of other designs than those shown may also incorporate the inventive solution.

It will be understood that the invention is not restricted to the aforedescribed and illustrated embodiment and that modifications can be made within the scope of the following claims.

What is claimed is:

1. A light emitting push button for operating purposes, wherein the push button includes a body which is double-molded from two different plastic materials, of which one material is light conductive and the other is opaque, and wherein a light emitting device is arranged to emit light on an underside of the push button so that the light is conducted through the light conductive material and is emitted on an upper side of the button, and wherein a slot is formed between the light conductive material and the opaque material on the upper side of the button, such that light conducted through the light conductive material scatters uniformly, whereby light scattered is visible from all directions.

2. A light emitting push button according to claim 1, wherein the slot extends to a depth of about 4 mm from the upper side of the button.

3. A light emitting push button according to claim 1, wherein the slot has a width of about 0.5 mm.

4. A light emitting push button comprising:

a body which is double-molded from two different plastic materials, of which one plastic material is light conductive and the other plastic material is opaque; and a slot formed between the light conductive plastic material and the opaque plastic material on an upper side of the body for uniformly scattering light conducted through the light conductive plastic material, wherein light uniformly scattered by the slot is emitted from the upper side of the body in all directions.

5. The light emitting push button of claim 4, wherein the slot extends to a depth of about four millimeters from the upper side of the body.

6. The light emitting push button of claim 4, wherein the slot is about one-half millimeter wide.

* * * * *